US009998206B2

(12) United States Patent
Janson

(10) Patent No.: US 9,998,206 B2
(45) Date of Patent: Jun. 12, 2018

(54) RING CONSTELLATIONS FOR DECREASED DATA LATENCY AND INCREASED DOWNLOAD RATES

(71) Applicant: The Aerospace Corporation, El Segundo, CA (US)

(72) Inventor: Siegfried W. Janson, Redondo Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 37 days.

(21) Appl. No.: 15/067,900

(22) Filed: Mar. 11, 2016

(65) Prior Publication Data

US 2016/0269098 A1  Sep. 15, 2016

Related U.S. Application Data

(60) Provisional application No. 62/131,668, filed on Mar. 11, 2015.

(51) Int. Cl.
*H04B 7/185* (2006.01)

(52) U.S. Cl.
CPC ..... *H04B 7/18513* (2013.01); *H04B 7/18521* (2013.01)

(58) Field of Classification Search
None
See application file for complete search history.

(56) References Cited

U.S. PATENT DOCUMENTS

| 5,722,042 A | * | 2/1998 | Kimura | H04B 7/195 342/352 |
| 6,267,329 B1 | * | 7/2001 | Chethik | B64G 1/1007 244/158.4 |
| 2009/0154391 A1 | * | 6/2009 | Wittenschlaeger | H04B 7/19 370/316 |
| 2012/0020280 A1 | * | 1/2012 | Jansson | H04B 7/18582 370/316 |
| 2012/0302160 A1 | * | 11/2012 | Silny | H04B 7/18508 455/12.1 |
| 2015/0358861 A1 | * | 12/2015 | Chuberre | H04B 7/18578 455/13.1 |
| 2016/0094288 A1 | * | 3/2016 | Krebs | H04B 7/18521 455/12.1 |
| 2016/0269100 A1 | * | 9/2016 | Welle | H04B 7/18521 |

OTHER PUBLICATIONS

Janson, S.W., et al., "Electric Propulsion for Low Earth Orbit Constellation Morphing", AIAA 2002-3669, 38th AIAA/ASME/SAE/ASEE Joint Propulsion Conference, Indianapolis, IN, 2002 (11 pages).

* cited by examiner

*Primary Examiner* — Brian Roberts
(74) *Attorney, Agent, or Firm* — Wilmer Cutler Pickering Hale and Dorr LLP

(57) ABSTRACT

A plurality of spacecraft may be dispersed into a ring constellation or structure. Data may be wirelessly relayed between spacecraft similar to data flowing in a ring network. The ring structure minimizes inter-spacecraft velocities and tracking angle motion to allow use of fixed high-gain radio frequency (RF) antennas or medium-divergence lasers for crosslinks. Data may flow between spacecraft to be downloaded by the next spacecraft that will be passing over a ground station. This reduces data latency when a single ground station is used, and significantly reduces data latency when more than one ground station is used.

11 Claims, 3 Drawing Sheets

RING CONSTELLATIONS FOR DECREASED DATA LATENCY AND INCREASED DOWNLOAD RATES

CROSS-REFERENCE TO RELATED APPLICATIONS

This application claims priority to U.S. Provisional Patent Application No. 62/131,668, filed Mar. 11, 2015, entitled "Ring Constellations for Decreased Data Latency and Increased Download Rates," which is hereby incorporated by reference in its entirety.

FIELD

The present invention relates to an application of ring constellations, and in particular, ring constellations for decreasing data latency and increasing download rates.

BACKGROUND

John Walker developed a notation for labeling a class of circular orbit patterns called the Walker Delta Pattern (hereinafter "Walker"). This class has since become the standard. The Walker notation is i: T/P/F, where i is the inclination, T is the total number of spacecraft, P is the number of evenly spaced planes, and F determines the phase relationship between adjacent planes. The change in true anomaly, in degrees, for equivalent satellites in neighboring planes is equal to F*360/T. The Walker number is an integer between 0 and P-1. Walker constellations for continuous Earth observation typically use multiple satellites per plane, such that T and P are different integers, and almost always use an F value greater than zero.

A trivial example of a ring constellation is a number of spacecraft in essentially the same orbit, such as a constellation of communications and weather satellites at geostationary Earth orbit. Some embodiments of the present invention relate to a more complex arrangement of multiple satellites forming a ring structure across different orbits in different orbit planes. Thus, it may be beneficial to implement a ring constellation using one or more Walker patterns.

SUMMARY

Certain embodiments of the present invention may provide solutions to the problems and needs in the art that have not yet been fully identified, appreciated, or solved by current communications systems. For example, in some embodiments, a low Earth orbit (LEO) ring constellation may provide continuous short-range inter-satellite connectivity for cross-linking data using fixed body-mounted antennas or optics.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1A illustrates the constellation when it is near the North Pole, FIG. 1B illustrates the constellation in the Northern Hemisphere, FIG. 1C illustrates the constellation in the Southern Hemisphere, and FIG. 1D illustrates the constellation when it is near the South Pole.

DETAILED DESCRIPTION OF THE EMBODIMENTS

Figure 1A:
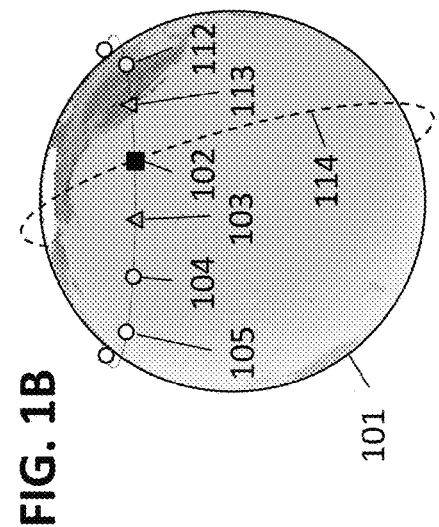
FIGS. 1A-1D illustrates time sequences of a Walker constellation, according to an embodiment of the present invention. In particular.
Figure 1B:
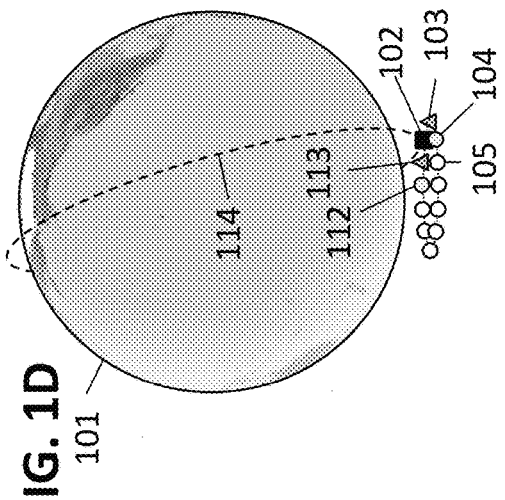
Figure 1C:
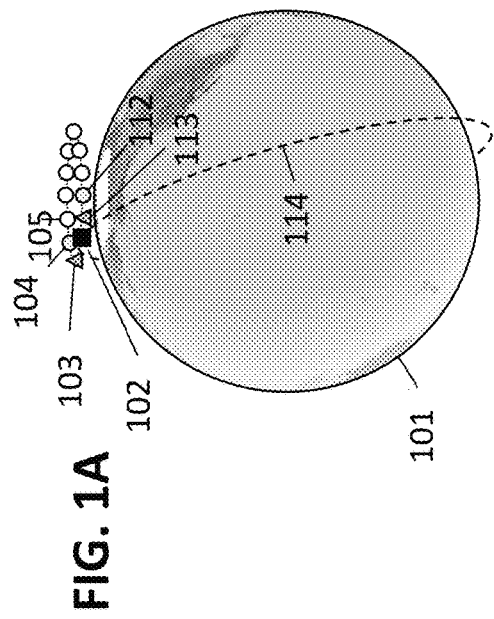

Spacecraft in LEO may pass over a ground station two to five times a day with a pass duration of up to fifteen minutes. Data latency, i.e., the time between when a measurement is taken and when the measurement is downloaded to a ground station for distribution, is typically many hours with a maximum of 12 hours. By dispersing spacecraft into a ring structure, data can be wirelessly relayed between spacecraft similar to data flowing in a ring network. The ring structure minimizes inter-spacecraft velocities and tracking angle motion to allow use of fixed high-gain radio frequency (RF) antennas or medium-divergence lasers for crosslinks. Data can flow between spacecraft to be downloaded by the next spacecraft to pass over a ground station. Data latency may be reduced to about 50 minutes using a single ground station, and less when more than one ground station is used. High-inclination ring constellations may allow simultaneous, short range (down to tens of km), high data rate crosslinks between all members of the constellation when the constellation ring is above the North pole or below the South pole.

A global constellation may be compressed into a single ring by using F=0 and T=P. FIGS. 1A-1D illustrates a time sequence 100 of a Walker constellation, according to an embodiment of the present invention. FIGS. 1A-1D illustrates an 80 degree: 12, 12, 0 constellation with a 700 kilometer altitude at times of 0, 15, 30, and 45 minutes. The constellation is a ring that oscillates about the Earth along the North and South axis. The spacecraft are farthest apart when they cross the equatorial plane, and are closest together at the North and South extremes. All satellites stay in a single plane, and the included angle between two neighboring spacecraft, for any particular spacecraft, is set only by the number of spacecraft.

Similarly, the included angle between second neighbors is also set by the number of spacecraft. FIGS. 1A-1D further illustrates spacecraft 102 as a filled square orbiting the Earth 101 in orbit 114, flanked by two first neighbors 103 and 113 shown as filled triangles, with second neighbors 104 and 112 as filled circles, at four different times. Crosslink antennas or optics to first neighbors, second neighbors, third neighbors, etc., can be fixed on the spacecraft and do not have to move independently.

Figure 1D:
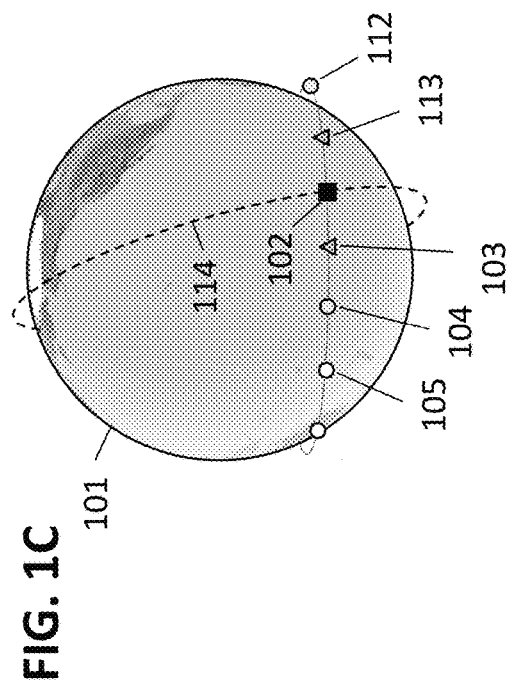

The fewest number of visible neighboring spacecraft occurs when the ring passes the equator. For example, at this time, at 700 kilometer altitude, any spacecraft can see one other spacecraft in one ring direction, and one other in the opposite ring direction. Maximum inter-spacecraft ranges may occur at this time. Similarly, minimum inter-spacecraft ranges may occur when the ring is at the furthest North or South excursion (as shown in FIGS. 1A and 1D), and any spacecraft can see all others when the ring moves above or below the North and South poles, respectively. A star network topology is possible when the ring is near the poles. Table 1 lists the nearest neighbor range for a 50:50:0 constellation at the equator, at the time when all spacecraft become co-visible as they approach the North or South pole of the Earth, and at maximum North or South excursion. Table 1 also lists the range to the opposite satellite when it is visible.

TABLE 1

Inter-satellite ranges at three positions of a 700 kilometer altitude 80 degree: 50/50/0 constellation.

| Condition | Inter-Satellite Range (km) | Opposite Satellite Range (km) |
| --- | --- | --- |
| Equatorial Crossing | 889 | N/A |
| Passing North or South pole | 391 | 6223 |
| Maximum North or South excursion | 154 | 2458 |

Note that the period of time over which every spacecraft can see all other spacecraft is 13.3 minutes for this particular constellation, and this may occur twice per orbit. Further increasing the inclination may reduce inter-satellite ranges at the North and South extremes.

Figure 2:
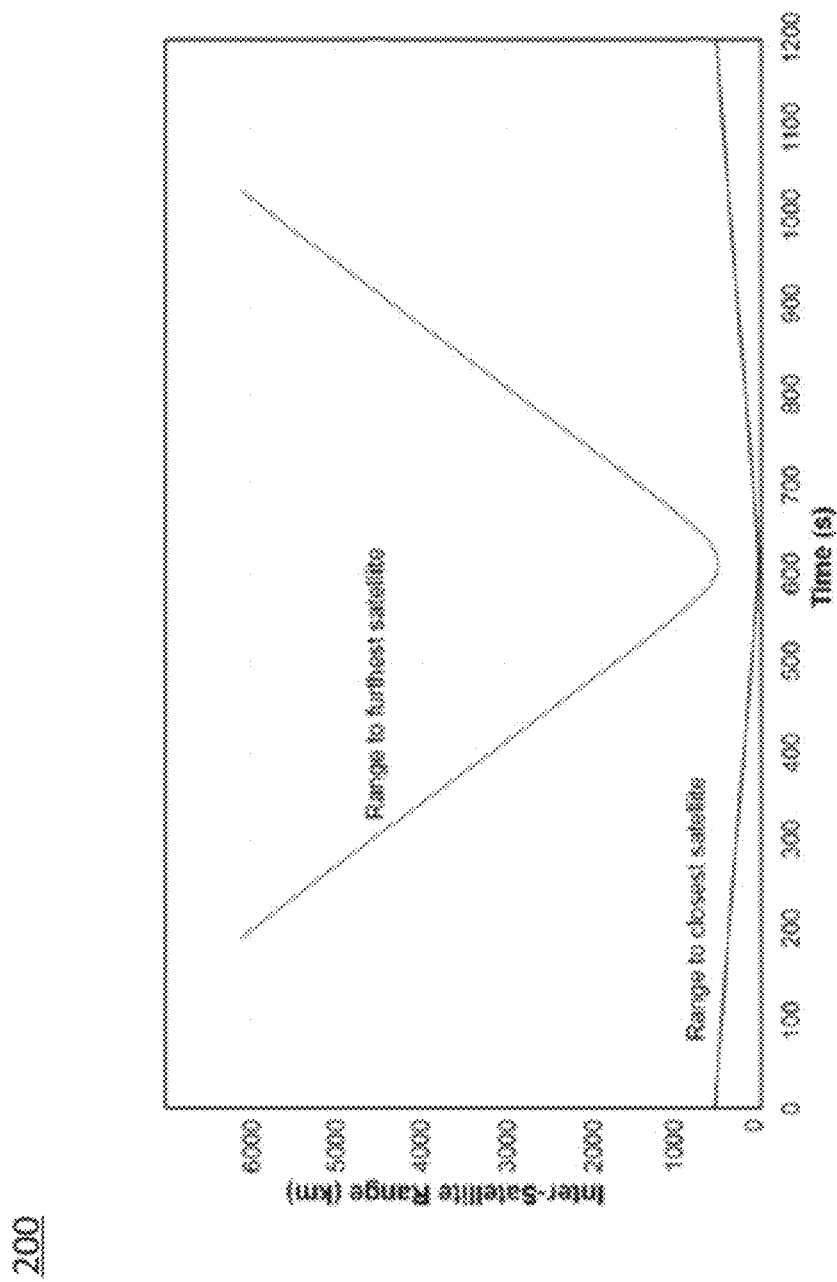
FIG. 2 illustrates an inter-satellite range as a function of time for a Walker constellation near one of the poles, according to an embodiment of the present invention.
Figure 3:
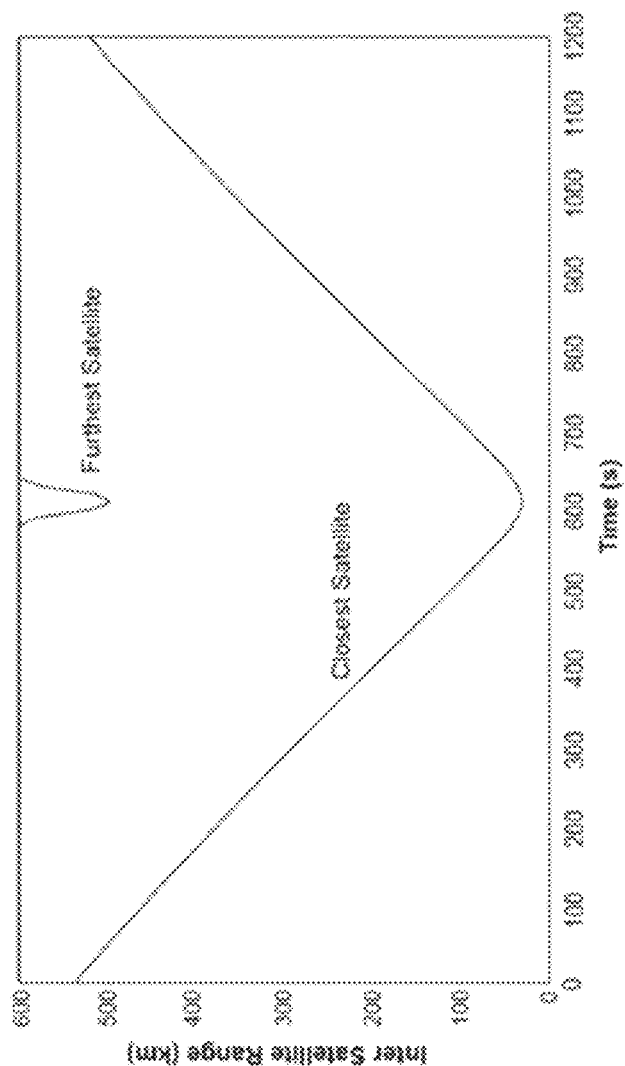
FIG. 3 illustrates Inter-satellite range as a function of time for a constellation near one of the poles, with an expanded range scale, according to an embodiment of the present invention.

Graph 200 of FIG. 2 and graph 300 of FIG. 3 illustrate inter-satellite range for the nearest and furthest neighbors for an 88 degree: 50/50/0 constellation as a function of time. The range between the satellites, which are further apart, is less than 1000 kilometers for over 100 seconds, and nearest neighbors are within 50 kilometers of each other over the same time period. With even higher inclinations, inter-satellite ranges below 10 kilometers may be possible.

In some embodiments, ring constellations may be useful for LEO systems that accumulate or distribute a terabyte or more of data per day using more 10 or more spacecraft in similar orbits, with data latency requirements of less than 2 hours. This may include Earth observation constellations, high data-rate store and forward communications, space weather monitoring, etc. High inclination constellations may also enable data collection or distribution over most of the planet, followed by periods of rapid data transfer between spacecraft when they are over the less interesting poles. Even if data is taken near the poles, there is significant overlap of satellite footprints, causing some satellites to continue data collection while others transfer data. In some embodiments, ground stations may be an optical ground station or a RF ground station.

Crosslinks may be optical or RF in certain embodiments. 60 gigahertz crosslinks, for example, may use 8 centimeter diameter transmit/receive antennas (e.g., 31 dBi gain) with 1 W output power to provide 500 Megabit/s rates at 100 kilometer range. Transfer rate between neighboring spacecraft may be 12.5 gigabytes over a 200 second wide window using a fixed data rate. See, for example, FIG. 3. With an adaptive data rate, more of the ~13 minute co-visibility window is available, and 25 gigabytes can be easily transferred between spacecraft. By flowing data around the ring in two directions, 50 gigabytes can be transferred to the one or more satellites that will pass over a ground station over the next half orbit. The number of active ground stations can be dynamically altered based on weather conditions at various ground stations.

A 2 gigabit/s optical downlink may require 200 seconds to download a 50 gigabyte payload. If at least one optical ground station is continuously available, downloads can occur twice per orbit with 1.4 terabytes downloaded per day. More data may be downloaded per day as more than one ground station becomes available at any given time.

The Walker i: N,N,0 constellation is a single ring constellation. However, embodiments utilizing multiple constellation rings may be possible using Walker i: N,N/2,0 constellations, where N is an even integer, Walker i: N,N/3, where N is an integer divisible by 3, etc. Additional multi-ring constellations may include Walker i: N,N,N/2 constellations, where N is an even integer, Walker N,N,N/3 constellations, where N is an integer divisible by 3, etc. Multiple constellation rings may increase the time utilization for any particular ground station, but decreases the data transfer rates between spacecraft due to increased ranges.

One or more embodiments of the present invention pertains to a ring of spacecraft that improves aggregate data downlink rates into the terabyte per day range. The ring structure enables spacecraft to cross-link data around the ring for on-board storage in one or more spacecraft that will pass over a ground station within an orbit period. While individual LEO spacecraft can take up to 12 hours to pass over a ground station, the ring of spacecraft passes over any mid-latitude ground station twice per orbit period, e.g., LEO orbit periods are between 90 and 120 minutes. With sufficiently dense rings, a spacecraft may have a favorable pass over a single mid-latitude ground station twice per orbit period. The ring structure provides a constant constellation configuration that enables use of fixed cross-link angles between spacecraft using body-mounted fixed antennas or optical elements. With inclinations in excess of 60 degrees, the ring structure may enable a star network topology over many minutes where any one spacecraft may communicate with any of the other spacecraft. Ring constellations may be based on Walker N,N,0 (single ring), N,N,N/2 (if N is an even integer for two rings), N,N,3 (if N is an integer divisible by 3 for three rings), etc.

In some embodiments, a LEO ring constellation may provide continuous short-range inter-satellite connectivity for cross-linking data using fixed body-mounted antennas or optics. This ring constellation significantly simplifies cross-link mechanical complexity and reduces cross-link system mass. Cross-linked data may be sent in some embodiments by each spacecraft to one or more spacecraft that will pass over a ground station during the next half orbit period. Ground stations may be used at least twice per orbit period rather than the typical 4 or 5 times per day. In some embodiments, ring constellations may include Walker i: N, N, 0, is N, N/2, 0 and i: N, N, N/2 constellations.

In some embodiments, a sufficient number of satellites are part of the ring constellation such that the satellites are within sufficient visibility of other satellites in the constellation throughout the entirety of satellites orbits such that any satellite within the constellation can directly or indirectly transmit data to any other satellite via the constellation. In some embodiments, a sufficient number of satellites are part of the ring constellation such that any satellite within the constellation can route data via the satellites in the constellation to any other satellite in the constellation throughout the entirety of the satellites orbits. The exact number of satellites required to enable full connectivity through the network in these embodiments may be calculated using the inclination and altitude of the orbits in the ring constellation by determining the number of satellites required to ensure that the Earth does not block line of sight between satellites such that the ring would be decomposed into arcs of the ring that are not connected to one another.

These constellations may be ideal for high-density LEO Earth observation constellations, such as Planet Labs Flock constellations, using laser downlinks. These constellations may enable significantly-reduced data latency and significantly-increased daily download rates.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A satellite network for reduced-latency data transmission to a ground station, comprising:
    a plurality of satellites arranged in a set of orbits, with each satellite in a different orbit and having identical orbit inclination, eccentricity, semi-major axis, argument of the perigee, and true anomaly, but with a different right ascension of the ascending node (RAAN) than the other satellites so as to form a ring, or partial ring, constellation for orbiting about the Earth, in which the angular displacement between satellites remains constant as the constellation orbits, though the relative distance between satellites may vary;
    wherein each satellite in the ring constellation comprises:
        one or more transceivers to communicate with one or more other satellites in the ring constellation; and
        multiple antennas each of which have a fixed orientation to communicate with corresponding satellites in the ring constellation; and
    wherein at least a subset of the satellites further include a down-link transmitter configured to optically transmit data to a ground station, and
    wherein a first satellite is configured to communicate with another satellite of the network via respective transceivers and antennas so that the other satellite may downlink data to a ground station with reduced latency compared to a ground station communication opportunity of the first satellite.

2. The network of claim 1, wherein the ring constellation is a Walker ring constellation.

3. The network of claim 2, wherein the ring constellation is a N,N,0 Walker ring constellation.

4. The network of claim 1, wherein the inclination of the ring constellation orbits are high enough to permit all satellites to see each other above the North or South poles twice per orbit.

5. The network of claim 4, wherein each of the plurality of satellites in the ring constellation are configured to directly communicate with any of the other members of the constellation when the constellation ring is above a pole of the Earth as the set of orbits provide that each satellite has a line of sight with all of the other satellites of the ring.

6. The network of claim 1, wherein each of the plurality of satellites in the ring constellation are configured to communicate with selectable other members of the constellation, and wherein the selectable other members provide access to an optical ground station during the next N/2 orbits where N is an integer less than 32.

7. The network of claim 1, wherein the constellation comprises at least 3 satellites.

8. The network of claim 1, wherein the transceivers are optical transceivers that communicate via body-mounted fixed optical elements.

9. The network of claim 1, wherein each satellite stores data while the ring constellation is less than one Earth radius above or below the Earth's equatorial plane, and wherein each satellite forwards data to a satellite in the plurality of satellites scheduled to have an earlier downlink opportunity while the ring constellation is at a larger distance to the Earth's equatorial plane.

10. The network of claim 1, wherein at least a subset of the satellites include receivers for receiving data from a client satellite which is not a member of the satellite network.

11. The network of claim 1, wherein the constellation comprises a sufficient number of satellites such that the any satellite within the constellation can route data via the satellites in the constellation to any other satellite in the constellation throughout the entirety of the satellites orbits.

* * * * *